United States Patent [19]

Cornelison et al.

[11] Patent Number: 5,288,470
[45] Date of Patent: Feb. 22, 1994

[54] METAL SUBSTRATE HAVING AN INSULATING BARRIER

[75] Inventors: Richard C. Cornelison, Hiram, Ohio; William B. Retallick, West Chester; Raymond J. Gorte, Philadelphia, both of Pa.

[73] Assignee: W. R. Grace & Co.-Conn., New York, N.Y.

[21] Appl. No.: 955,460

[22] Filed: Oct. 2, 1992

[51] Int. Cl.$^5$ .................. B01D 53/34; B01J 23/40; B01J 23/56; F01N 3/10
[52] U.S. Cl. ..................... 422/177; 60/300; 422/174; 502/332; 502/333; 502/334
[58] Field of Search ........... 422/174, 177; 60/299, 60/300; 502/332, 333, 334; 423/213.5

[56] References Cited

U.S. PATENT DOCUMENTS

| | | | |
|---|---|---|---|
| 4,601,999 | 7/1986 | Retallick et al. | 502/314 |
| 4,762,567 | 8/1988 | Retallick | 106/287.17 |
| 4,928,485 | 5/1990 | Whittenberger | 422/180 |
| 4,976,929 | 12/1990 | Cornelison et al. | 422/174 |
| 5,070,694 | 12/1991 | Whittenberger | 422/174 |
| 5,118,475 | 6/1992 | Cornelison | 422/177 |
| 5,141,912 | 8/1992 | Ernest et al. | 502/334 |

FOREIGN PATENT DOCUMENTS 4-203416 7/1992 Japan .
2247413 3/1992 United Kingdom .

Primary Examiner—Robert J. Warden
Assistant Examiner—L. M. Crawford
Attorney, Agent, or Firm—Edward J. Cabic

[57] ABSTRACT

A metal substrate contains a barrier which functions as an electrical insulator. One can thus use the substrate to make an electrically heated catalytic converter, in which one must electrically isolate a catalyst-bearing strip from adjacent strips. One forms the substrate by first coating the substrate with a thin first layer of alumina washcoat and heating the substrate to a temperature of about 800° to 1000° C. This heating step produces the barrier, which may constitute a spinel. One can then apply a catalyst to the substrate, either by applying one or more secondary layer(s) of washcoat, having greater thickness than the first layer, and impregnating the second layer with the catalyst, or by coating the substrate with a washcoat which already contains the catalyst. Alternatively, one can omit the step of applying the catalyst, and can use the strips to form a heater for a stream of gas. One can use the heater in conjunction with a main catalytic heater, or as a stand-alone heater.

42 Claims, 3 Drawing Sheets

METAL SUBSTRATE HAVING AN INSULATING BARRIER

BACKGROUND OF THE INVENTION

This invention relates to the field of compact electrically powered heaters mounted in exhaust streams from chemical or manufacturing processes or from engines, both mobile and stationary.

One can use such heaters (a) for bringing exhaust streams up to temperature rapidly under cold start conditions, for emission control, and (b) for holding exhaust streams at sufficiently high temperatures, such that a catalyst can be heated to and held at or above its light-off temperature, where it becomes effective, and (c) for general process heating.

In a particular application of the invention, an electrically heatable cord is close-coupled to a conventional catalyst or catalysts in the exhaust system of a vehicle. The heatable core serves to heat the conventional catalyst during initial cold start conditions, according to a predetermined heating-control strategy, by means of radiative and convective transfer of heat energy.

In a second embodiment of the invention, the heated elements (metal strips) are coated with catalyst materials and can be positioned upstream of a conventional catalyst or catalysts. The light-off of the catalyst adhered directly to the strip is more rapid than in the case above. In this latter case, the heater is known as an "electrically heated converter" (EHC). Descriptions of EHCs appear in U.S. Pat. Nos. 4,928,485, 4,976,929, and 5,070,694. This specification hereby incorporates by reference the disclosures of all of the above-cited patents.

In either the first or the second embodiment of the invention, the new devices trigger the release of chemical energy to provide heat to light-off the main catalyst and maintain the gas stream at the light-off temperature.

In its most general form, the present invention comprises an electrically powered non-catalytic heater which can be used to heat a gas stream.

SUMMARY OF THE INVENTION

One forms the substrate of the present invention according to the following process. The surface of the metal substrate is coated with a thin first layer of alumina, of the order of about 1-12 mg per square inch. Next, one heats the substrate to a temperature of about 800° to 1000° C. This heating step creates the electrically insulating barrier described above.

The coated substrate as described above constitutes one embodiment of the invention. This embodiment can be used to form a non-catalytic, electrically powered heater for a gas stream.

In a second embodiment, one starts with the substrate having the barrier, and then coats the substrate with one or more secondary layers of alumina and/or other metal oxides. The total thickness of the secondary layer(s) exceeds the thickness of the first layer. One then applies a catalyst to the coated substrate, usually by impregnating the secondary metal oxide layer(s) with catalyst. One could alternatively form the secondary layer(s) by coating the substrate with a washcoat which already contains a catalyst. In either case, the coated substrate can be used to form an EHC.

Further, the central structural members of the heater or EHC require an insulating barrier to prevent internal short circuits. These members can be made from the metals described herein, and coated as described herein, to provide an insulating barrier.

The substrate comprises a metal conductor that will withstand high temperatures, and may include alloys having iron, cobalt, or nickel as their major component.

The barrier of the present invention apparently comes from a reaction between an oxide of the base metal (formed during the high temperature heating step) and the alumina. This reaction appears to form a spinel, which constitutes the barrier.

One can use the substrate of the present invention to advantage in a heater or in an EHC, as described above, because the barrier comprises an electrically insulating layer or dielectric that eliminates the need for separate interleaved pieces of insulation between the heated strips. When the substrate has a catalyst coating, one can also use it in the more general field of catalytic combustion. In particular, one can use the catalyst-bearing substrate in a high-temperature catalytic combustor.

The present invention therefore has the primary object of providing a substrate having an electrically insulating barrier formed on its surface.

The present invention has the further object of providing a substrate as described above, wherein the barrier is subsequently coated with a catalyst.

The invention has the further object of providing an electrically-heated catalytic converter (EHC) having catalyst-bearing metal strips which does not require woven ceramic cloth or other separate pieces of insulation.

The invention has the further object of providing an electrically-powered non-catalytic heater for heating a gas stream.

The invention has the further object of reducing the cost of making an EHC, or of making an electrically powered heater for gas streams, by reducing both material costs and assembly time associated with the use of cloth insulation.

The invention has the further object of providing a very thin interlaminar insulating barrier so that the void fraction of the assembled core is about 90%.

The person skilled in the art will recognize other objects and advantages of the present invention, from a reading of the following brief description of the drawings, the detailed description of the invention, and the appended claims.

DETAILED DESCRIPTION OF THE INVENTION

In one embodiment, the present invention comprises a metal substrate which has a barrier that functions as an electrical insulator, preventing current flowing in the metal substrate from flowing to adjacent strips. In another embodiment, the substrate has a catalyst coating, so that it can function as an EHC.

According to both embodiments, one makes the metal substrate using the following method. First, one coats the surface of the substrate with a thin first layer of a washcoat of alumina. U.S. Pat. No. 4,762,567, incorporated by reference herein, describes such an alumina washcoat. Next, one heats the substrate to a temperature of about 800° to 1000° C. This heating step forms the barrier that provides the desired electrical insulation for the substrate.

In the embodiment in which the substrate contains a catalyst, one begins with a substrate having the insulating barrier, made as described above, and then performs the steps of coating the substrate with one or more secondary layer(s) of alumina washcoat, and applying a catalyst to the substrate, such as by impregnating the secondary washcoat layer(s) with the catalyst metal. Alternatively, one could combine the latter two steps by applying to the substrate a washcoat which already contains a metal catalyst.

The washcoat can comprise one or more metal oxides, including alumina, and/or ceria, and/or titania. The invention is not limited to washcoats containing alumina.

The first washcoat layer preferably has a weight in the range of about 1-12 mg per square inch. The total weight of the secondary layers normally exceeds that of the first layer.

In the preferred embodiment, one forms the substrate of a metal alloy capable of withstanding high temperatures, such as an alloy having iron, cobalt, or nickel as its major component. The substrate may be as thin as a foil, with a thickness of about 0.001 inch. Preferably one selects the catalyst from the platinum group metals. In general, one needs a substrate which can withstand elevated temperatures such as those experienced in the exhaust stream of an automobile engine.

Figure 1:
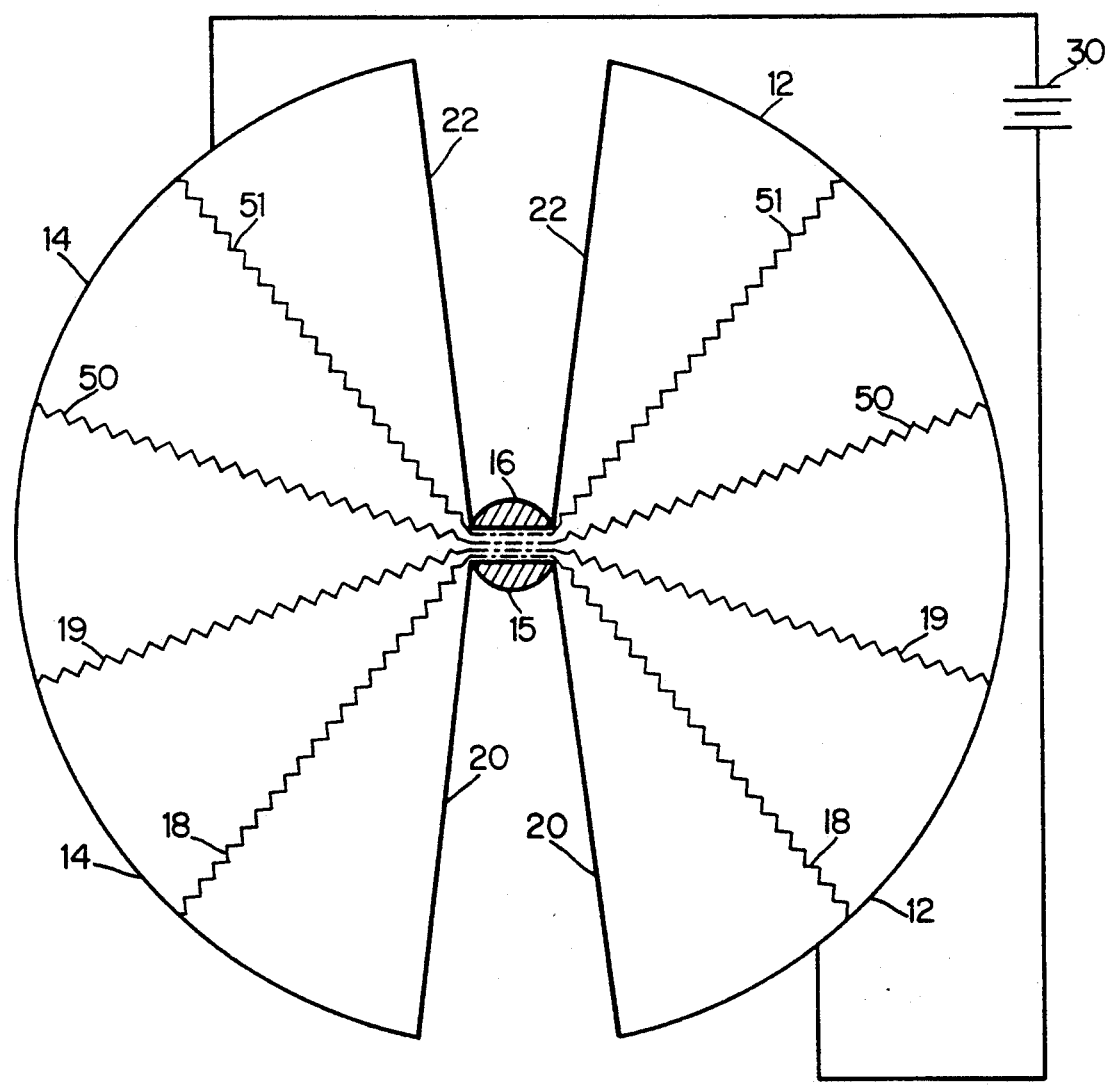
FIG. 1 provides a partially schematic and partially cross-sectional view showing the formation of an EHC or heater from one or more strips of foil.
Figure 2:
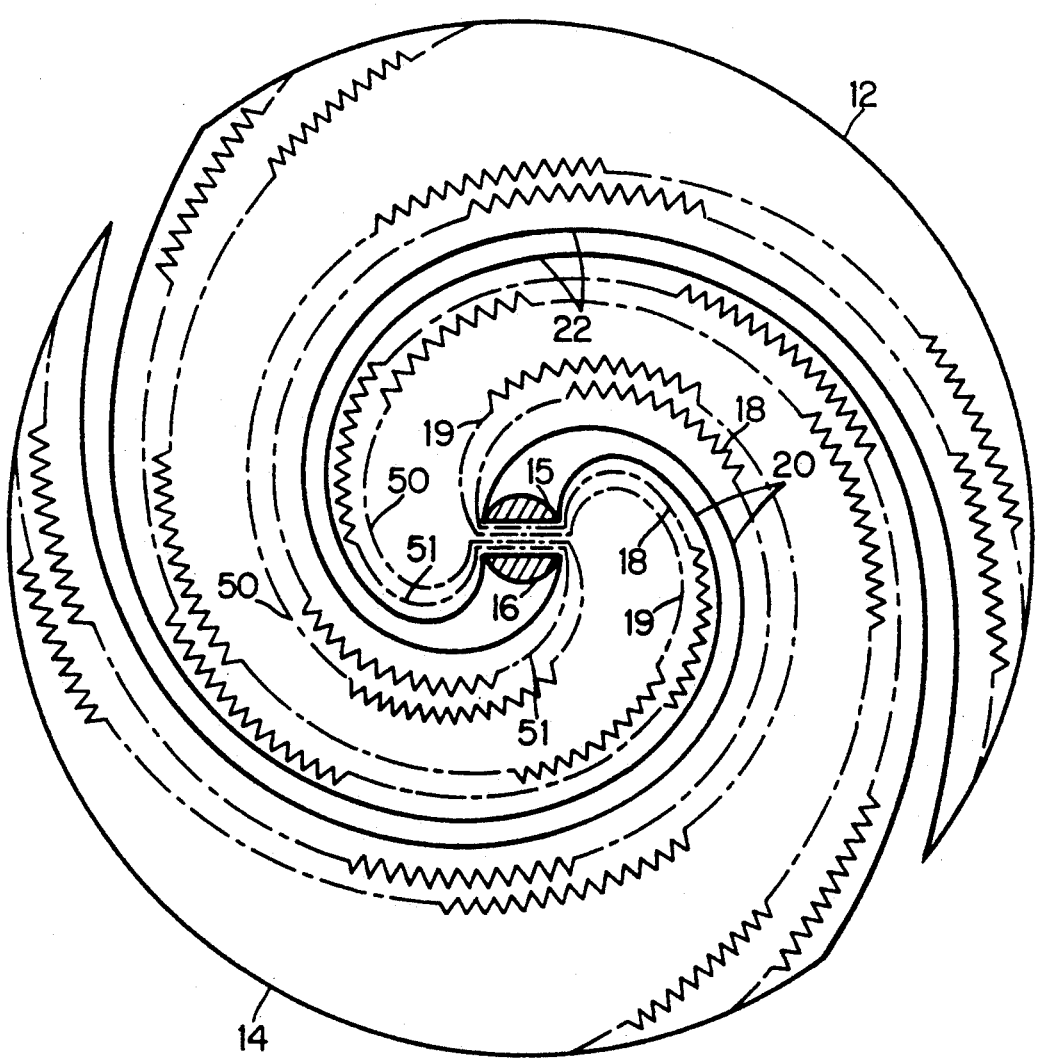
FIG. 2 provides a view similar to FIG. 1, but showing the metal strips being wound into a spiral.

FIGS. 1 and 2 show a cross-sectional view of an electrically heated converter (EHC) to which one can apply the electrical barrier of this invention. There are one or more strips of corrugated metal foil 18 and two strips 20 and 22 of ceramic electrically insulating cloth. In the example shown, there are four such strips of foil 18, 19, 50, and 51. The strips of foil and the strips of cloth all have the same length. Originally, all of these strips were arranged to form a sandwich with insulating strips 20 and 22 on the top and bottom and foil strip(s) 18 in between, as shown in FIG. 1. The midpoint of this sandwich is inserted between the two arms 15 and 16 of a mandrel. Then the sandwich is wound around the mandrel to form the spiral structure, as shown in FIG. 2.

FIG. 1 illustrates the electrical connections. As indicated by reference numeral 12, the right-hand ends of the metal strips are electrically connected together, and are also connected to one terminal of battery 30. As shown by reference numeral 14, the left-hand ends of the metal strips are also electrically connected together, and are also connected to the other terminal of the battery. In practice, the electrical connections would be made after the spiral has been wound; FIG. 1 illustrates the connections only for purposes of clarity of explanation.

In FIGS. 1 and 2, the cloth strips 20 and 22 prevent the spiral from developing internal short circuits. With the present invention, the metal strips contain the insulating barrier, and thus, with the present invention, one can omit the ceramic cloth strips.

Figure 3:
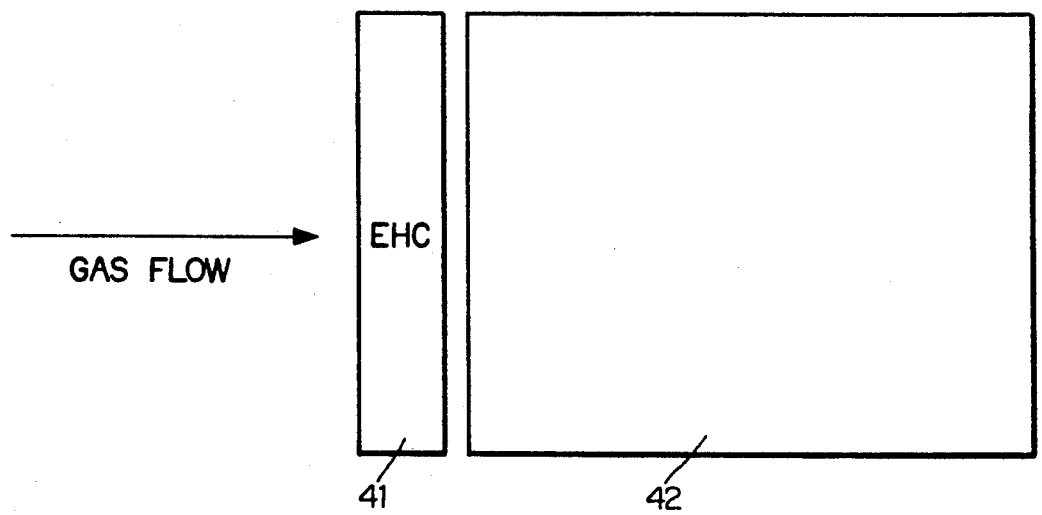
FIG. 3 shows a block diagram of an uncatalyzed heater, made according to the present invention, and used to preheat a gas stream.

The structure of FIGS. 1 and 2 can be used as a stand-alone heater, or it can be used in conjunction with a separate catalytic converter. The block diagram of FIG. 3 illustrates this point. EHC 41 can have the structure shown in FIG. 2, except that its strips do not have a catalyst. Main catalytic combustor 42 is arranged such that gas flowing through the EHC 41 then flows through combustor 42. Combustor 42 can be a conventional ceramic honeycomb, coated with a combustion catalyst, or it can have some other structure which benefits from receiving a heated gas stream.

Alternatively, the uncatalyzed EHC can comprise a "stand-alone" heater for a gas stream. In the latter case, combustor 42 would be eliminated.

Figure 4:
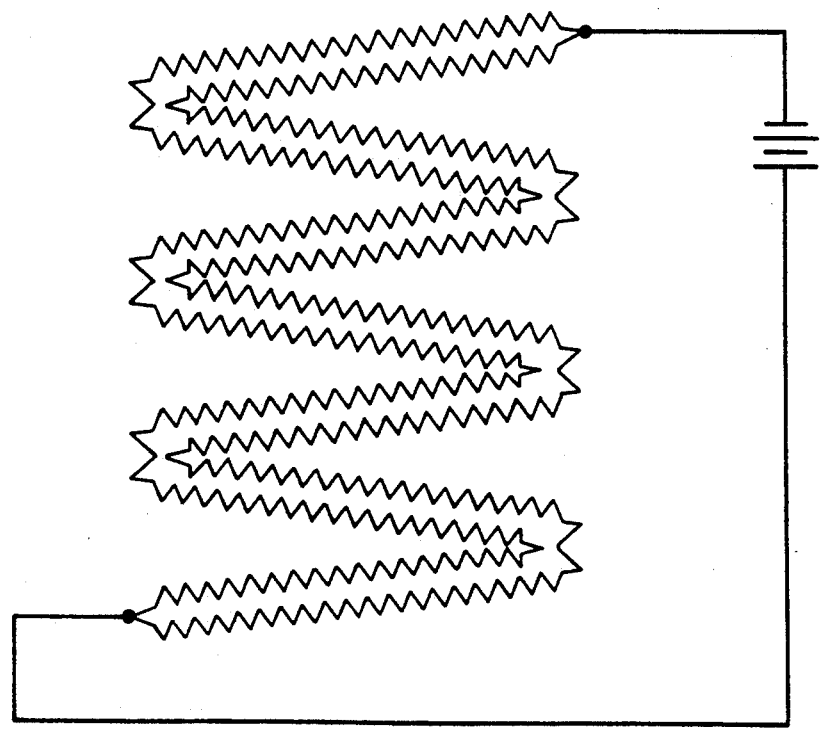
FIG. 4 shows a schematic diagram of a pair of metal strips folded back and forth upon themselves, and connected to a voltage source.

FIG. 4 shows an alternative embodiment, wherein a pair of metal strips, formed with the barrier as described above, are folded back and forth upon themselves, in a zig-zag pattern. The ends of the strips are connected to a voltage source, shown as a battery in FIG. 4, so that the strips can function as an EHC (if the strips bear a catalyst) or as an uncatalyzed heater for a gas stream (if the strips bear no catalyst).

The preferred catalysts are selected from the group consisting of platinum, palladium, and rhodium. If one uses two or more strips to form an EHC, one can apply different catalysts to different strips. For example, one could prepare three strips, one having platinum, one having palladium, and one having rhodium. These strips could then be wound into a spiral or formed into a zig-zag structure. In another example, one could have two strips with platinum and one strip with palladium. In general, for an EHC having a plurality of strips, one can use any combination of catalysts on any of the strips.

The following provides an explanation of the chemical process believed to occur when one forms the barrier on a nickel-based alloy. However, one should not consider this explanation to limit the scope of the invention. It appears that heating a substrate made of a nickel-based alloy, with the first layer of alumina, above 800° C., causes the nickel to oxidize. The nickel oxide reacts with the alumina (aluminum oxide) to form a spinel, having the formula $NiAl_2O_4$. In a spinel, the oxide ions have a stacked cubic close packed geometry. For each oxygen anion there are two tetrahedral holes and one octahedral hole. The size of the oxygen anions far exceeds that of the metal cations, so that cations reside in the holes formed between the anions. In this spinel, $Ni^{2+}$ ions occupy one-eighth of the tetrahedral holes, and $Al^{3+}$ ions occupy one-half of the octahedral holes, corresponding to the ratio in $NiAl_2O_4$. A similar explanation is believed to apply in the case of alloys having other metals, such as iron or cobalt, as their major constituents.

This spinel forms the barrier which defines the major feature of the present invention. The barrier forms an insulating layer which enables one to use the coated substrate effectively for the purposes described herein.

The barrier not only forms a good dielectric for the voltage differentials experienced in EHCS, but also is hard and adheres tightly to the metal substrate, and subsequently accepts coatings of metal oxides used to carry catalysts such as platinum, palladium, and rhodium.

The following examples summarize various tests which demonstrate the advantages of the invention.

EXAMPLE 1

Two materials were used as substrates, namely Haynes Alloy No. 25 (containing 20% chromium, 10% nickel, 15% tungsten, 3% iron, with the balance cobalt), and Haynes Alloy No. 188 (containing 22% nickel, 22% chromium, 14% tungsten, and 0.04 lanthanum, with the balance cobalt). These alloys bear a number on one side only, making it easy to keep track of which side contains which coating. The following summarizes the details of the experiments:

| Haynes Alloy No. | 25 | 188 |
|---|---|---|
| Dimensions of strip, inches | 4.10 × 8.96 | 2.22 × 8.96 |
| Square inches per side | 37 | 20 |
| Thickness, mm | 0.295 | 0.330 |
| Weight burned off at 400° C. (in g) | 63.33 | 37.85 |
| Weight when first side coated once and calcined at 400° C. | 63.39 | 37.88 |
| Weight when second side coated and calcined | 63.44 | 37.91 |
| Weight when first side coated twice and calcined at 400° C. | 63.52 | 37.95 |
| Weight after heating to 1000° C. | 63.80 | 37.96 |
| Color | Charcoal Black | Little change; still dimly reflecting |

After the final heating step shown above, an ohmmeter measured the degree to which the coated strip acted as an electrical insulator. For the Alloy No. 25, some electrical conduction occurred between the ohmmeter probes, with less current flow on the first side having the double coat. For the Alloy No. 188, the ohmmeter indicated infinite resistance between probes, on both sides of the strip.

This Example shows that one can form an electrically insulating barrier, according to the present invention, with cobalt as the major component of the substrate.

EXAMPLE 2

This Example describes the formation of a barrier on two alloys wherein the major constituent is iron. Alloy NP-614 is available from Armco, Inc.; U.S. Pat. No. 4,601,999 describes the composition of the latter alloy. This specification hereby incorporates by reference the disclosure of the latter patent.

The present sample comprised a base metal core of 11% chromium in iron, with a coating of aluminum. This composition was rolled down to foil thickness and then heat treated at about 800° C. to convert the aluminum to a porous aluminum oxide. This porous oxide by itself is not an electric insulator.

Alfa IV is available from Allegheny Ludlum Corp. Its composition is 20% chromium, 5% aluminum, minor amounts of other elements, and the balance iron.

The strips were 9×3.5 inches, with a thickness of about 0.002 inch. The following presents the weights (in grams) at various stages of the process:

|  | NP-614 | Alfa IV |
|---|---|---|
| Bare strip | 8.86 | 7.04 |
| First side coated once, calcined at 400° C. | 8.92 | 7.09 |
| Second side coated once, calcined at 400° C. | 8.99 | 7.14 |
| First side coated twice, calcined at 400° C. | 9.08 | 7.22 |
| Heated to 1000° C. | 9.11 | 7.24 |

One measured the resistance of the barrier formed on the strips by placing the probes of an ohmmeter on the barrier. Both strips showed infinite resistance between the ohmmeter probes, on both sides of the strip.

EXAMPLE 3

This Example demonstrates the formation of an insulating barrier at temperatures of 800° C., 900° C., and 1000° C. This Example uses an alloy available from Haynes International, Inc., of Kokomo, Ind., sold under the name Haynes Alloy No. 214. This alloy has the following composition:

16% Chromium
2.5% Iron
4.5% Aluminum
Balance Nickel

The strips were 3.75 inches wide. The following presents the results of the experiments on three such strips:

|  | Strip No. 1 | Strip No. 2 | Strip No. 3 |
|---|---|---|---|
| Length of strip, in inches | 8.7 | 9.0 | 9.0 |
| Weight of bare strip, in grams | 9.56 | 10.02 | 10.02 |
| First side coated once, calcined at 600° C. | 9.63 | 10.07 | 10.06 |
| Second side coated once, calcined at 600° C. | 9.69 | 10.12 | 10.12 |
| Final temperature (°C.) | 800 | 900 | 1000 |
| Final weight | 9.69 | 10.14 | 10.12 |

All three strips showed infinite resistance between the ohmmeter probes. This infinite resistance was observed when the ohmmeter probes were pressed against the surface of the barrier and held still. When the barrier was scratched by moving the probes, the barrier was broken in spots and there was a flow of current. The weight of the barrier in this Example is about 2 mg per square inch.

EXAMPLE 4

This Example shows the effect of varying the weight of the insulating barrier by about fourfold. The alloy is the same Haynes Alloy No. 214 as used in Example 3. The strips were 3.75 inches wide and 7.4 inches long. The following summarizes the results of the experiments:

| Number of coatings on both sides of strips | 2 | 3 | 4 | 6 |
|---|---|---|---|---|
| Weight of bare strip, grams | 8.22 | 8.22 | 8.18 | 8.21 |
| Weight coated and calcined at 400° C. | 8.38 | 8.50 | 8.60 | 8.85 |
| Weight after heating to 1000° C. | 8.40 | 8.52 | 8.60 | 8.85 |
| Weight of coating, mg per square inch | 2.9 | 5.0 | 7.4 | 11.5 |

As in Examples 2 and 3, there was infinite resistance on all four strips when the ohmmeter probes were pressed against the surface and held still. There was a difference when the probes were moved to scratch the barrier. There was a progressive increase in the integrity of the barrier as the weight of the barrier was increased.

EXAMPLE 5

This Example provides another indication of the electrical insulating property of the barrier formed according to the present invention.

This Example used two pairs of foil strips, one prepared according to the present invention, and the other prepared according to the prior art. The prior art foil, made of Haynes Alloy No. 214, had three coats of alumina washcoat, the first coat having a weight of 5 mg/in$^2$, and the next two coats both having weights in the range of 10–12 mg/in$^2$. The strips had a width of 3.75 inches and corrugations having a height of 0.050 inches.

The foil prepared according to the present invention also comprised Haynes Alloy No. 214, and had a width of 4.0 inches and corrugations having a height of 0.055 inches. One first coated this foil with an alumina washcoat, at a weight of about 3–5 mg/in$^2$. The coating was dried and calcined. Then, one passed the coated foil through a stress relief oven, at 900° C. The dwell time in the oven was about one minute. One then applied three coats of alumina in the same manner as for the prior art foil.

One tested both of these pairs of foil strips in the following manner. One stacked two foil strips (both coated in the same manner) upon each other horizontally, and connected one end of each strip to a variable transformer. One placed an insulating material between the foil strips to limit the overlapping area to 28 in$^2$. One placed a weight of 3.23 lbs evenly distributed on this area to insure full area contact. One then applied an AC voltage to the strips, starting at zero volts, and slowly increasing to a maximum of 120 volts AC. Next, one abraded the foil against itself, by dragging one strip over the other, with a weight of 5.34 lbs on the overlapping area, for a distance of 7 inches. One returned the foil to its original position and applied an AC voltage, which again varied slowly from 0 to 120 volts. The whole procedure was repeated until the point of conduction was found by noting a significant increase in current flow between the foil layers.

One performed the above procedure separately for the foil made according to the present invention, and for the foil made according to the prior art.

For the foil made according to the prior art, the point of conduction occurred after one abrasion, and the voltage at failure was 0.5 volt. For the foil made according to the present invention, the point of conduction occurred after six abrasions, and the voltage at failure was 92 volts.

Example 5 thus demonstrates the clearly superior insulating properties of the barrier made according to the present invention.

Haynes Alloy No. 230 is another example of a metal which can be used as an electrically conducting strip with a thin electrically insulating coating on both sides.

While the specification describes the invention with respect to certain embodiments and examples, the reader skilled in the art will recognize many possible variations. One should consider such variations within the spirit and scope of the following claims.

What is claimed is:

1. A metal substrate having an electrically insulating barrier, the substrate being made by the method comprising the steps of:
   a) coating the surface of a metal substrate with a first layer of an alumina washcoat, and
   b) heating the substrate to a temperature of about 800° to 1000° C. for a time of about one minute.

2. The substrate of claim 1, wherein step (b) is followed by a step of applying a catalyst to the substrate.

3. The substrate of claim 2, wherein the applying step is preceded by a step of coating the substrate with at least one second layer of one or more metal oxides.

4. The substrate of claim 3, wherein the step of applying catalyst comprises impregnating the second layer with a catalyst.

5. The substrate of claim 3, wherein the step of applying catalyst comprises coating the substrate with a washcoat of one or more metal oxides, wherein the washcoat contains the catalyst.

6. Apparatus for heating a stream of gas, comprising a strip of the catalyst-bearing metal substrate of claim 2, the strip being wound into a general spiral configuration and connected at either end to a voltage source.

7. Apparatus for heating a stream of gas, comprising a strip of the catalyst-bearing metal substrate of claim 2, the strip being folded back and forth upon itself in a zig-zag pattern and connected at either end to a voltage source.

8. Apparatus for heating a stream of gas, comprising a plurality of strips of the catalyst-bearing metal substrate of claim 2, the strips being arranged in a core held within a housing, the strips being connectable to a source of electric current.

9. The substrate of claim 1, wherein the first layer has a weight of about 1–12 mg per square inch.

10. The substrate of claim 1, wherein the first layer has a weight of about 1–6 mg per square inch.

11. The substrate of claim 1, wherein the major constituent of the substrate is selected from the group consisting of nickel, cobalt, and iron.

12. The substrate of claim 1, wherein the heating step is performed by passing the substrate continuously through an oven.

13. A method of making a metal substrate having an electrically insulating barrier, the method comprising the steps of:
   a) coating the surface of a metal substrate with a first layer of an alumina washcoat, and
   b) heating the substrate to a temperature of about 800° to 1000° C. for a time of about one minute.

14. The method of claim 13, further comprising step of applying a catalyst to the substrate.

15. The method of claim 14, wherein the applying step is preceded by a step of coating the substrate with a second layer of one or more metal oxides.

16. The method of claim 15, wherein the applying step comprises impregnating the second layer with a catalyst.

17. The method of claim 15, wherein the applying step comprises coating the substrate with a washcoat of one or more metal oxides, wherein the washcoat contains the catalyst.

18. The method of claim 13, wherein the first layer has a weight of about 1–12 mg per square inch.

19. The method of claim 13, wherein the first layer has a weight of about 1–6 mg per square inch.

20. The method of claim 13, wherein the major constituent of the substrate is selected from the group consisting of nickel, cobalt, and iron.

21. The method of claim 13, wherein the heating step is performed by passing the substrate continuously through an oven.

22. An electrically-heated catalytic converter comprising a plurality of metal strips disposed within a housing, the strips being spaced so as to allow gas to flow through at least one channel defined by the strips, and means for directing electric current through the strips, wherein the strips are made by the method comprising the steps of:
a) coating the surface of a metal substrate with a first layer of an alumina washcoat,
b) heating the substrate to a temperature of about 800° to 1000° C., the heating being performed for a time of about one minute, and
c) applying a catalyst to the substrate.

23. The electrically-heated catalytic converter of claim 22, wherein the catalyst applied to each strip is selected from the group consisting of platinum, palladium, and rhodium, and wherein at least two of the strips bear different catalysts.

24. The electrically-heated catalytic converter of claim 22, wherein step (c) is preceded by a step of coating the substrate with a second layer containing one or more metal oxides.

25. The electrically-heated catalytic converter claim 24, wherein step (c) comprises impregnating the second layer with a catalyst.

26. The electrically-heated catalytic converter of claim 25, wherein the catalyst applied to each strip is selected from the group consisting of platinum, palladium, and rhodium, and wherein at least two of the strips bear different catalysts.

27. The electrically-heated catalytic converter of claim 22, wherein step (c) comprises coating the substrate with a washcoat containing one or more metal oxides and also containing the catalyst.

28. The electrically-heated catalytic converter of claim 27, wherein the catalyst applied to each strip is selected from the group consisting of platinum, palladium, and rhodium, and wherein at least two of the strips bear different catalyst.

29. The electrically-heated catalytic converter of 22, wherein the first layer has a weight of about 1-12 mg per square inch.

30. The electrically-heated catalytic converter of claim 22, wherein the major constituent of the substrate is selected from the group consisting of nickel, cobalt, and iron.

31. Apparatus for heating a stream of gas, the apparatus comprising a plurality of metal strips disposed within a housing, the strips being spaced so as to allow gas to flow through at least one channel defined by the strips, and means for directing electric current through the strips, wherein the strips are made by the method comprising the steps of:
a) coating the surface of a metal substrate with a layer of an alumina washcoat, and
b) heating the substrate to a temperature of about 800° to 1000° C. so as to form an electrically insulating barrier on the substrate, the heating being performed for a time of about one minute.

32. The apparatus of claim 31, wherein the alumina layer has a thickness of about 1-12 mg per square inch.

33. The apparatus of claim 31, wherein the major constituent of the substrate is selected from the group consisting of nickel, cobalt, and iron.

34. The apparatus of claim 31, wherein the apparatus is connected to a main catalytic heater, in such a manner that gas flows first through said channel and then through the main catalytic heater.

35. The apparatus of claim 31, wherein the strips are arranged in a general spiral configuration.

36. The apparatus of claim 31, wherein the strips are folded back and forth upon themselves in a zig-zag configuration.

37. A metal substrate having an electrically insulating barrier, the substrate being made by the method comprising the steps of:
a) coating the surface of a metal substrate with a first layer of a metal oxide washcoat, and
b) heating the substrate to a temperature of about 800° to 1200° C. for a time of about one minute.

38. The substrate of claim 37, wherein the metal oxide is alumina.

39. The substrate of claim 37, wherein the heating step is performed by passing the substrate continuously through an oven.

40. A method of making a metal substrate having an electrically insulating barrier, the method comprising the steps of:
a) coating the surface of a metal substrate with a first layer of a metal oxide washcoat, and
b) heating the substrate to a temperature of about 800° to 1200° C. for a time of about one minute.

41. The method of claim 40, wherein the metal oxide is alumina.

42. The method of claim 40, wherein the heating step is performed by passing the substrate continuously through an oven.

* * * * *